United States Patent [19]

Hess

[11] 3,739,103

[45] June 12, 1973

[54] SYSTEM FOR THE ADJUSTMENT OF THE PHASE POSITION OF AN ALTERNATING VOLTAGE

[75] Inventor: Heinz Hess, Weiterstadt, Germany

[73] Assignee: Fernseh GmbH, Darmstadt, Germany

[22] Filed: July 13, 1970

[21] Appl. No.: 54,242

[30] Foreign Application Priority Data

July 12, 1969 Germany.................. P 19 35 445.1

[52] U.S. Cl........... 178/69.5 CB, 307/262, 328/24, 328/55, 328/155

[51] Int. Cl............................ H04l 7/08, H03b 3/04

[58] Field of Search............ 178/69.5 DC, 69.5 CB, 178/69.5 G, 5.4 SY; 328/21, 24, 154, 55, 155, 187, 104; 333/29; 307/262, 293, 295; 235/186; 323/122; 332/16

[56] References Cited

UNITED STATES PATENTS

| | | | |
|---|---|---|---|
| 3,065,403 | 11/1962 | Lehmann et al. | 235/186 |
| 3,530,365 | 9/1970 | Deugh | 323/122 |
| 3,475,626 | 10/1969 | Holzman et al. | 328/155 |
| 3,270,127 | 8/1966 | Hansen | 178/5.4 SY |
| 3,504,110 | 3/1970 | Wagner | 178/5.4 HE |
| 3,647,965 | 3/1972 | Butler | 178/69.5 DC |

*Primary Examiner*—Robert L. Griffin
*Assistant Examiner*—John C. Martin
*Attorney*—Littlepage, Quaintance, Wray and Aisenberg

[57] ABSTRACT

Phase-position adjuster, particularly for color television studio use, for generating signals of varying phase shifts and combining them by selective switching to generate a phase-corrected signal.

6 Claims, 2 Drawing Figures

Inventor:
Heinz Heß
by
Littlepage, Quaintance, Wray & Aisenberg
Attorneys

SYSTEM FOR THE ADJUSTMENT OF THE PHASE POSITION OF AN ALTERNATING VOLTAGE

BACKGROUND OF THE INVENTION

1. Field of the Invention

The invention relates to a circuit arrangement for adjusting the phase position of an alternating voltage, and particularly of the color auxiliary carrier for television purposes.

2. Description of the Prior Art

In the art of color television, and in particular in color television studio practice, the problem frequently arises of adjusting the phase position of a color auxiliary carrier. For example, in large studio complexes, the transit times required for the color television signals and the color auxiliary carrier to travel between separate color television devices are so large that it is frequently necessary to make phase corrections by using phase shifters, because even slight deviations in the phase positions of color auxiliary carriers can cause color saturation errors.

Because, under certain conditions, the transit times for the above-mentioned signals can change frequently because of switching between signal paths, systems are known for automatically matching the phase positions of various signals with respect to each other. These systems also require phase shifters which can be adjusted by control voltages applied to them. These phase shifters are classified into continuously operating fine phase shifters and coarse phase shifters having only a few stages.

SUMMARY OF THE INVENTION

The present invention discloses coarse phase shifters, distinguished by simplicity and reliability in operation, for television use. In a system according to invention, an alternating voltage having a predetermined phase position is delivered to a network having the two outputs. At these outputs, there appear respectively two further alternating voltages phase-displaced from each other by about 60° or 120°. To each of the outputs of the network, a switch is directly connected, and another switch is connected to each output through a 180° phase shifter. The outputs from the switches are connected to the inputs of an adding circuit.

In addition to simplicity of the circuit arrangement according to the invention, it also has the advantage that the amplitude of the delivered alternating voltage is independent of the adjusted phase position.

BRIEF DESCRIPTION OF THE DRAWINGS

Equivalent components in these figures are provided with the same reference characters.

DESCRIPTION OF THE PREFERRED EMBODIMENT

Figure 1:
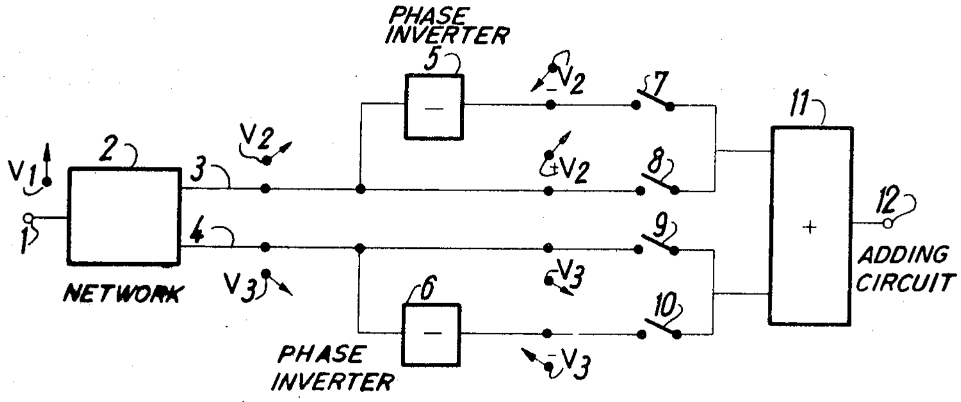
FIG. 1 is a block circuit diagram of a circuit arrangement according to the invention.

In the circuit arrangement according to FIG. 1, an alternating voltage delivered at point 1 has a phase position represented on the diagram by an arrow marked with the reference $V_1$. The network 2, which can comprise various known circuits, is provided with two output lines 3 and 4, on each of which a further alternating voltage appears. These further alternating voltages $V_2$ and $V_3$ exhibit a phase displacement from each other of about 120° or 60°. These voltages are delivered direct to switches 8 and 9, and are also delivered through respective phase inversion stages 5 and 6 to respective switches 7 and 10. Thus, at the switches 7, 8, 9 and 10, there will appear respective voltages $-V_2$, $V_2$, $V_3$ and $-V_3$. The output poles of the switches are connected in pairs to the inputs of an adding circuit 11, whose output terminal 12 forms the output of the circuit arrangement.

According to the settings of the switches 7, 8, 9 and 10, there will appear at the output 12 of the circuit arrangement an alternating voltage whose phase position may be adjusted in steps of 60°. For example, if only the switch 7 is closed, there will appear at the output 12 an alternating voltage corresponding to the voltage $-V_2$. By additionally closing the switch 10, there will also appear a voltage $-V_3$ which is phase displaced in the clockwise direction through 60° as compared with $-V_2$.

The same effect is achieved if the network 2 delivers two voltages whose phase positions differ by 60° from each other. In that case, only a different relationship will exist between the switch positions and the phase positions at the output 12 of the circuit arrangement.

Figure 2:
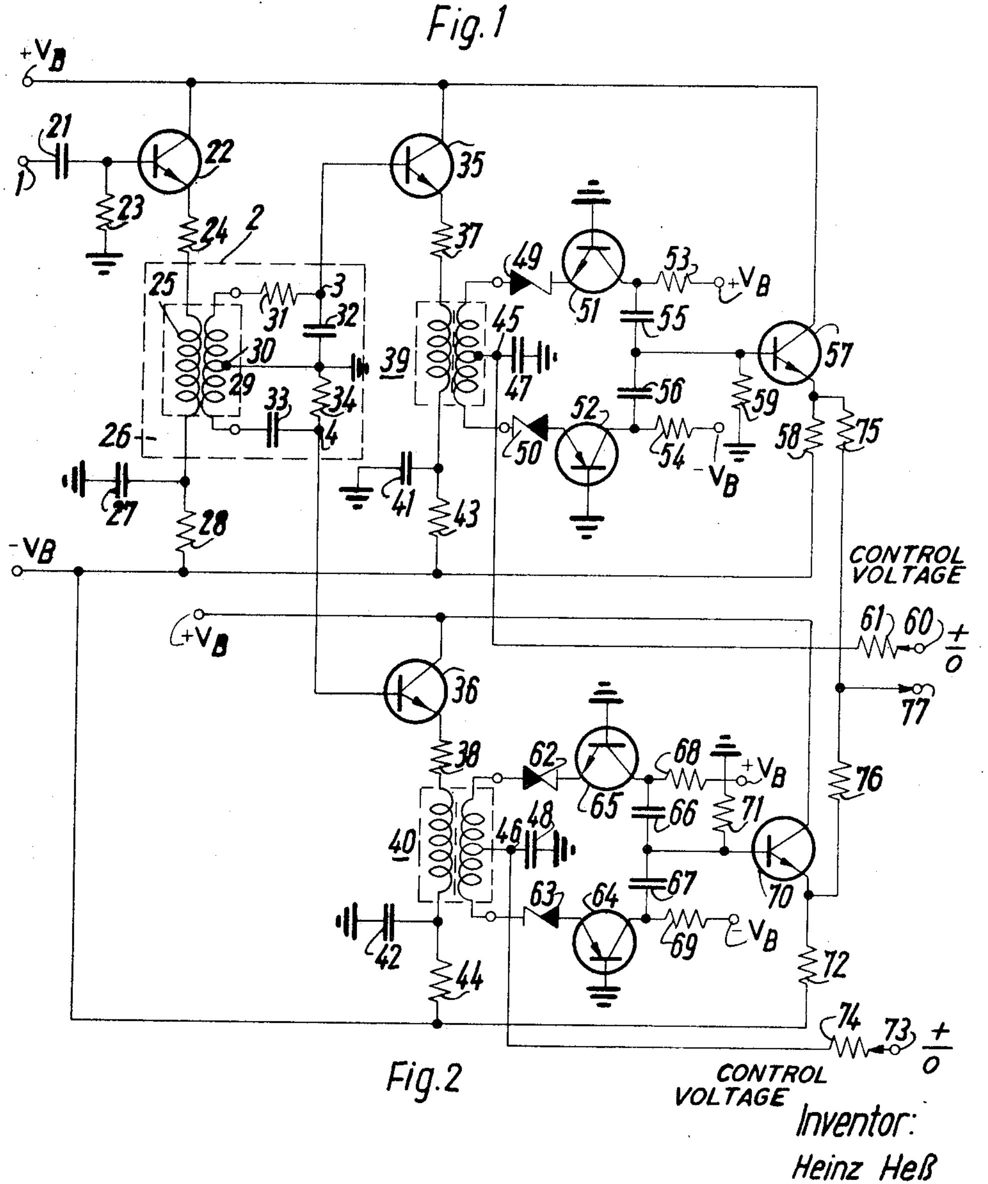
FIG. 2 is a schematic circuit diagram of a practical example of the invention.

FIG. 2 shows a practical embodiment of a circuit arrangement. Again an alternating voltage with a predetermined phase position is applied at point 1. This voltage proceeds across a capacitor 21 to the base of a transistor 22, to which is applied a bias voltage through a resistance 23. The collector of transistor 22 is connected to the positive value end $+V_B$ of an operating voltage source. A primary winding 25 of a transformer 26 is connected through a resistance 24 to the emitter of transistor 22. The other end of the primary winding is connected via the alternating current path of a capacitor 27 to a constant potential, in this case ground potential. A negative operating voltage $-V_b$ is delivered through a resistance 28. A center tap (not illustrated) of the voltage source is connected to ground potential.

The transformer 26 has a secondary winding 29, which is provided with a center tap 30, connected to ground potential. One end of the secondary winding 29 is connected to an RC network having a low-pass characteristic, and including a resistance 31 and a capacitor 32.

The junction point between the resistance 31 and the condenser 32 forms the output terminal 3 of the network 2. The other end of the secondary winding is connected to an RC network having a high-pass characteristic and including the resistance 34 and the capacitor 33, whose junction point forms the output terminal 4 of the network 2. At the output terminals 3 and 4, alternating voltages are established whose phase positions differ from each other by about 120°. These alternating voltages are delivered in each case to further respective transformers 39 and 40 connected as impedence transformers, to which connection is respectively made through transistors 35 and 36 and through respective resistors 37 and 38. In a manner similar to the making of connections to the transformer 26, the ends of the primary windings of the transformers 39 and 40 remote from the transistors are connected, through respective capacitors 41 and 42, to ground, and through respective resistances 43 and 44 to the negative pole $-V_B$ of the voltage source. The center taps 45 and 46 of the secondary windings of the transformers 39 and 40 are connected to ground through respective capacitors 47 and 48. Moreover, as will be further described, a control voltage is delivered to each of these secondary windings.

The two ends of the secondary winding of transformer 39 are connected respectively through Zener diodes 49 and 50 to the emitters of respective transistors 51 and 52. Transistors 51 and 52 are of opposite conductivity type, and the operating voltages are derived respectively through resistances 53 and 54 from the positive and the negative poles of the operating voltage source. The bases of the transistors 51 and 52 are grounded, and the collectors of these transistors are connected respectively through capacitors 55 and 56 to the base of the transistor 57. Transistor 57 is connected as an emitter-follower, and includes a resistance 58 as a load resistance. The resistance 59 develops a direct base voltage at the base of the transistor 57. The control voltage is delivered to the center tap 45 through a terminal 60 and a series resistance 61. According to whether the control voltage is positive, or negative, or ground potential, either the transistor 52 or the transistor 51 will be conductive, or neither of these will be conductive. Thus the alternating voltage appearing at the point 3 is transmitted with its existing or reversed polarity, or is not transmitted at all.

To the secondary winding of the transformer 40 there is connected a similar type of circuit arrangement, comprising the Zener diodes 62 and 63, the transistors 64 and 65, the capacitors 66 and 67, and the resistors 68 and 69, as well as an emitter-follower stage comprising the transistor 70 and resistors 71 and 72. To this circuit there is also delivered a control voltage through the terminal 73 and the series resistor 74, whereby the alternating voltage existing at the point 4 is transmitted either with its existing polarity, or with reversed polarity, or is not transmitted at all according to whether the control voltage at terminal 73 is positive, negative or at ground potential.

The alternating voltages existing at the emitters of the transistors 57 and 70 are delivered to an output terminal 77 of the circuit arrangement through resistances 75 and 76.

The transformer 39 and 40 constitute the phase- reversal stages 5 and 6, while the switches 7, 8, 9 and 10 embody the transistors 51, 52, 64 and 65, and the adding stage 12 includes the resistances 75 and 76.

What is claimed is:

1. A system for adjusting phase position of an alternating voltage input signal to derive a phase-adjusted output signal comprising:

network means having an input terminal and two output terminals for receiving said input signal on said input terminal and for respectively providing on said two output terminals two network output signals phase-displaced with respect to each other, phase-inversion means comprising a pair of transformers, each having a primary and a center-tapped symmetrical secondary winding, said two network output signals being connected to the respective primary windings, whereby a signal appears at one end of each secondary winding which is equivalent to the non-inverted corresponding network output signal and a signal appears at the other end of each secondary winding which is equivalent to the phase-inverted corresponding network output signal, a center-tap of each center-tapped secondary winding being coupled to a fixed potential, switch means comprising four selectively-operable voltage-controlled electronic switches, four Zener diodes for respectively connecting the four dignals from the ends of the secondary windings of the pair of transformers to the four electronic switches, and signal combining means having input and output terminals, capacitor means for connecting the signals from the four switches to input terminals of said signal combining means, whereby said signal combining means adds the signals from whichever of said four switches is selectively operated, whereby, by selective operation of the switch means, a phase adjusted output signal appears on the output terminal of the signal combining means.

2. A system for adjusting phase position of an alternating voltage input signal comprising:

a source of input signals, a network having an input connected to the source and having first and second outputs for respectively providing on the two outputs two network output signals phase displaced with respect to each other, first and second phase transmitting means respectively connected to the first and second network outputs for transmitting the network output signals, first and second phase reversing means respectively connected to the first and second network outputs for reversing the network output signals, individual voltage-controlled electronic switch means serially connected to each of the transmitting means and the reversing means for completing signal circuits, switch controlling means connected to switches for selecting transmitted and reversed signals, and signal combining means having inputs connected to the switches and having an output for combining selected transmitted and reversed signals into a single phase adjusted signal, which appears at the output.

3. The system of claim 2 wherein the voltage-controlled electronic switches are respectively serially connected between the transmitting means and the combining means and between the reversing means and the combining means.

4. A system according to claim 2 wherein said switch means comprises four voltage-controlled electronic switches respectively connected to switch said two network output signals and said two phase-inverted signals.

5. A system for adjusting phase position of an alternating voltage input signal comprising:

a source of input signals, a network having an input connected to the source and having first and second outputs for respectively providing on the two outputs two network output signals phase displaced with respect to each other, first and second phase transmitting means respectively connected to the first and second network outputs for transmitting the network output signals, first and second phase reversing means respectively connected to the first and second network outputs for reversing the network output signals, individual switch means serially connected to each of the transmitting means and the reversing means for completing signal circuits, switch controlling means connected to switches for selecting transmitted and reversed signals, and signal combining means having inputs connected to the switches and having an output for combining selected transmitted and reversed signals into a single phase adjusted signal, which appears at the output, the individual switch means comprising voltage controlled electronic switches serially connected between the transmitting means and the combining means and between the reversing means and the combining means, the switches associated with one network output being mutually reversed unidirectionally conducting switches, and the switch controlling means comprising line means for applying positive or negative voltage to the switches whereby one switch associated with a network output is turned on while another switch associated with that network output is turned off.

6. The system of claim 5 wherein the switch means comprise Zener diodes and serially connected transistors.

* * * * *